(12) United States Patent
Hörmann

(10) Patent No.: US 7,362,067 B2
(45) Date of Patent: Apr. 22, 2008

(54) APPARATUS FOR CONTROLLING A DOOR DRIVE

(75) Inventor: Michael Hörmann, Oerlinghausen (DE)

(73) Assignee: Marantec Antriebs- und Steuerungstechnik GmbH, Marienfeld (DE)

( * ) Notice: Subject to any disclaimer, the term of this patent is extended or adjusted under 35 U.S.C. 154(b) by 278 days.

(21) Appl. No.: 11/325,246

(22) Filed: Jan. 3, 2006

(65) Prior Publication Data

US 2006/0158145 A1    Jul. 20, 2006

(30) Foreign Application Priority Data

Jan. 4, 2005  (DE) .................. 20 2005 000 058 U
Jan. 28, 2005  (DE) .................. 20 2005 001 410 U

(51) Int. Cl.
*G05B 5/00* (2006.01)

(52) U.S. Cl. ....................... 318/466; 318/467; 318/468; 318/469

(58) Field of Classification Search ................. 328/466, 328/467, 468; 347/11; 318/469, 266, 265, 318/282, 286

See application file for complete search history.

(56) References Cited

U.S. PATENT DOCUMENTS

2003/0189609 A1 * 10/2003 Ishikawa ..................... 347/11

FOREIGN PATENT DOCUMENTS

DE          19918414         11/2000

* cited by examiner

*Primary Examiner*—Karen Masih
(74) *Attorney, Agent, or Firm*—Alleman Hall McCoy Russell & Tuttle LLP

(57) ABSTRACT

The present disclosure relates to an apparatus for controlling a door drive comprising a path-measuring apparatus for the sensing of a door position and/or a door drive position and for the emitting of a corresponding door position signal as well as comprising a control device for the control of the door drive in dependence on an absolute value of the door position signal and at least one reference point. In accordance with the present disclosure, the apparatus for controlling a door drive is characterized in that the path-measuring apparatus is made with at least two channels and comprises an absolute value encoder for the emitting of an absolute value signal on a first channel and a reference value encoder for the emitting of a plurality of reference point signals on a second channel, and the control device distinguishes a respective reference point signal from other reference point signals using the associated absolute value signal and controls the door drive starting from a specific reference point.

17 Claims, 2 Drawing Sheets

# APPARATUS FOR CONTROLLING A DOOR DRIVE

CROSS REFERENCE TO RELATED APPLICATION

This application claims priority to German Utility Model Application Ser. No. 202005000058.2 filed Jan. 4, 2005 and German Utility Model Application Ser. No. 202005001410.9 filed Jan. 28, 2005, both of which are hereby incorporated by reference in its entirety for all purposes.

FIELD

The present disclosure relates to an apparatus for controlling a door drive comprising a path-measuring apparatus for the sensing of a door position and/or a door drive position and for the emitting of a corresponding door position signal as well as comprising a control device for the control of the door drive in dependence on an absolute value of the door position signal and at least one reference point.

BACKGROUND AND SUMMARY

A door drive of this type which works both with an absolute value of the path-measuring signal reproducing the door position and with reference points is known from DE 195 22 622 C2. A path-measuring apparatus is associated with the door drive described therein which has a rotary potentiometer which is rotated in accordance with the movement of the door drive. A periodic door position signal in accordance with the door movement is emitted by the potentiometer, with its absolute value, however, not unambiguously indicating the door position, due to the periodicity of the signal. To nevertheless achieve an unambiguous determination of the door position, the maxima and the minima of the potentiometer signal are counted and considered as virtual reference points. The determination of the door position then takes place using the counted reference points and the absolute value of the potentiometer signal following a respective reference point. With this already known door drive, however, a relatively complicated evaluation of the potentiometer signal is required. On the one hand, minima and maxima have to be determined and then counted. In addition, the accuracy of the position determination and, accordingly, the fineness of the control of the door drive tend to be limited, since, beyond the reference points, the exact position determination only takes place using the analog potentiometer signal.

To avoid a reference point determination of this type, it is proposed in WO 02/04775 A1 to provide an absolute value encoder for the sensing of the door position or of the door drive position, with its signal always reproducing the position of the door unambiguously. An inductively operating absolute value encoder is used which reproduces the door position or the door drive position in a door position signal which constantly increases monotonically or constantly decreases monotonically. In addition to this absolute value encoder, an incremental encoder known per se can also be used in accordance with WO 02/04775 A1 which generates corresponding path pulses on a door movement which are then counted to control the door drive accordingly. Provision is made in this process for the control to use either the absolute value signal or the incremental signal for the control of the drive. A switch is made in a time multiplex process between the absolute value signal and the incremental signal. The absolute value signal of the absolute value encoder should in particular be used when the door is at a standstill, whereas the control makes use of the signals of the incremental encoder on movements of the door drive. In this process, however, the usual operating problems with incremental controls can occur such as errors in the signal counting, data amount, etc.

It is therefore the underlying object of the present disclosure to provide an improved door drive control which avoids the disadvantages of the prior art and further develops said prior art in an advantageous manner. An error-free and sensitive control of the door drive should preferably be made possible with a simple signal processing.

This object is solved in accordance with the present disclosure by an apparatus for controlling a door drive comprising: a path-measuring apparatus for the sensing of a door position and/or a door drive position and for the emission of a corresponding door position signal and a control device for the control of the door drive in dependence on an absolute value of the door position signal and at least one reference point, where the path-measuring apparatus is made with at least two channels and includes an absolute value encoder for the emitting of an absolute value signal on a first channel and a reference value encoder for the emitting of a plurality of reference point signals on a second channel; and where the control device distinguishes a respective reference point signal from other reference point signals using the associated absolute value signal and controls the door drive starting from a specific reference point.

In contrast to the already known generic prior art which, the teaching in accordance with the present disclosure makes use of both the absolute value of a door position signal and reference points for the control of the door drive. Further, in one embodiment, the present disclosure dispenses with the complex determination of signal maxima and signal minima and with the counting of such maxima and minima of the absolute door position signal. Instead of determining virtual reference points on the absolute door position signal in a complex manner, the present disclosure provides two separate signals, namely, on the one hand, an absolute door position signal and a preferably digital reference point signal. The path-measuring apparatus is made with at least two channels and includes an absolute value encoder for the emitting of an absolute value signal on a first channel and a reference value encoder for the emitting of a plurality of reference point signals on a second channel. The control device determines the control signal for the control of the door drive from both signals equally. A respective reference point signal is distinguished from other reference point signals using the associated synchronously sensed absolute value signal. The control device then controls the door drive starting from the respectively determined reference point.

Various possibilities result by the combined use of both the absolute value signal and of the separately generated reference point signal. On the one hand, it is possible also to use absolute value signals which, unlike in WO 02/04775 A1, are not constantly monotonic. For the unambiguous determination of the door position, it only has to be ensured that the combination of the respective reference point signal and of the synchronously sensed absolute door position signal is unambiguous. It would be conceivable for this purpose to provide at least two different reference point signal types. On the other hand, it is also possible to work with only one single reference point signal type, i.e. the reference point signal which is the same per se is always generated on the sweeping over of the different reference points when the absolute value encoder emits an unambiguously discrete absolute value signal over the total travel path. In comparison with DE 195 22 622 C2, it is possible to dispense with the painstaking signal evaluation, i.e. the determination of maxima and minima and their counting, by the combination of an absolute value signal and a separate reference point signal.

In a further development of the present disclosure, the path-measuring device is made with three channels. In addition to the absolute value signal and to the reference point signal, path pulses are generated by an incremental encoder on a third channel on a movement of the door or of the door drive. The control device counts these incremental path pulses starting from a specific reference point and controls the door drive in dependence on the number of counted path pulses. By the use of these three path-measuring signals, i.e. of an absolute value signal, a reference point signal and of incremental path pulses, in combination with one another, the advantages of the individual control systems can be maintained, but the disadvantages can be eliminated. A coarse control so-to-say takes place using the absolute value signal, i.e. the majority of reference points can be distinguished from one another in a simple manner. In addition, the usual problems of reference point controls and incremental controls on a power failure or an uncoupled manual operation of the door no longer play a role. The control always knows in which position the door is located, at least roughly. On the other hand, a fine control is made possible by the path pulses of the incremental encoder which would never be achievable alone with the always limited resolution of an absolute value signal. In this process, the processing of the signals of the incremental encoder is simplified by making use of reference points.

In accordance with a particularly advantageous embodiment of the present disclosure, the absolute value encoder and the reference point encoder are combined in a single sensor. A two-channel path sensor can in particular be provided in which the said absolute value encoder and the reference point encoder are integrated. In addition to this two-channel path sensor, a path signal encoder can be provided separately which is incremental per se.

In a further development of the present disclosure, a potentiometer can be provided as the absolute value encoder which preferably emits an unambiguously discrete absolute value signal over the whole travel path of the door and/or of the door drive. A voltage switch can be provided as the reference point encoder. The designing of the absolute value encoder as a potentiometer and of the reference point encoder as a voltage switch makes it possible in a simple manner to integrate these two components in one single sensor.

The path sensor advantageously has a signal encoder element which is movable in accordance with the door movement and/or the door drive movement and by which both the absolute value encoder and the reference point encoder can be actuated. The signal encoder element can in particular carry two pick-ups, of which the one actuates a potentiometer circuit and the other actuates a voltage switch.

In an advantageous further development of the present disclosure, both the potentiometer circuit and the circuit forming the voltage switch are arranged in the form of concentric circles on a substrate relative to which the said signal encoder element is rotatably supported. Said signal encoder element is rotated over the substrate in accordance with the door movement or door drive movement and in this process actuates both the potentiometer circuit which makes the absolute value signal available and the circuit which forms the voltage switch and emits the reference points for the corresponding door movement.

BRIEF DESCRIPTION OF THE FIGURES

The present disclosure will be explained in more detail in the following with respect to a preferred embodiment and to associated drawings. There are shown in the drawings.

DETAILED DESCRIPTION

Figure 1:
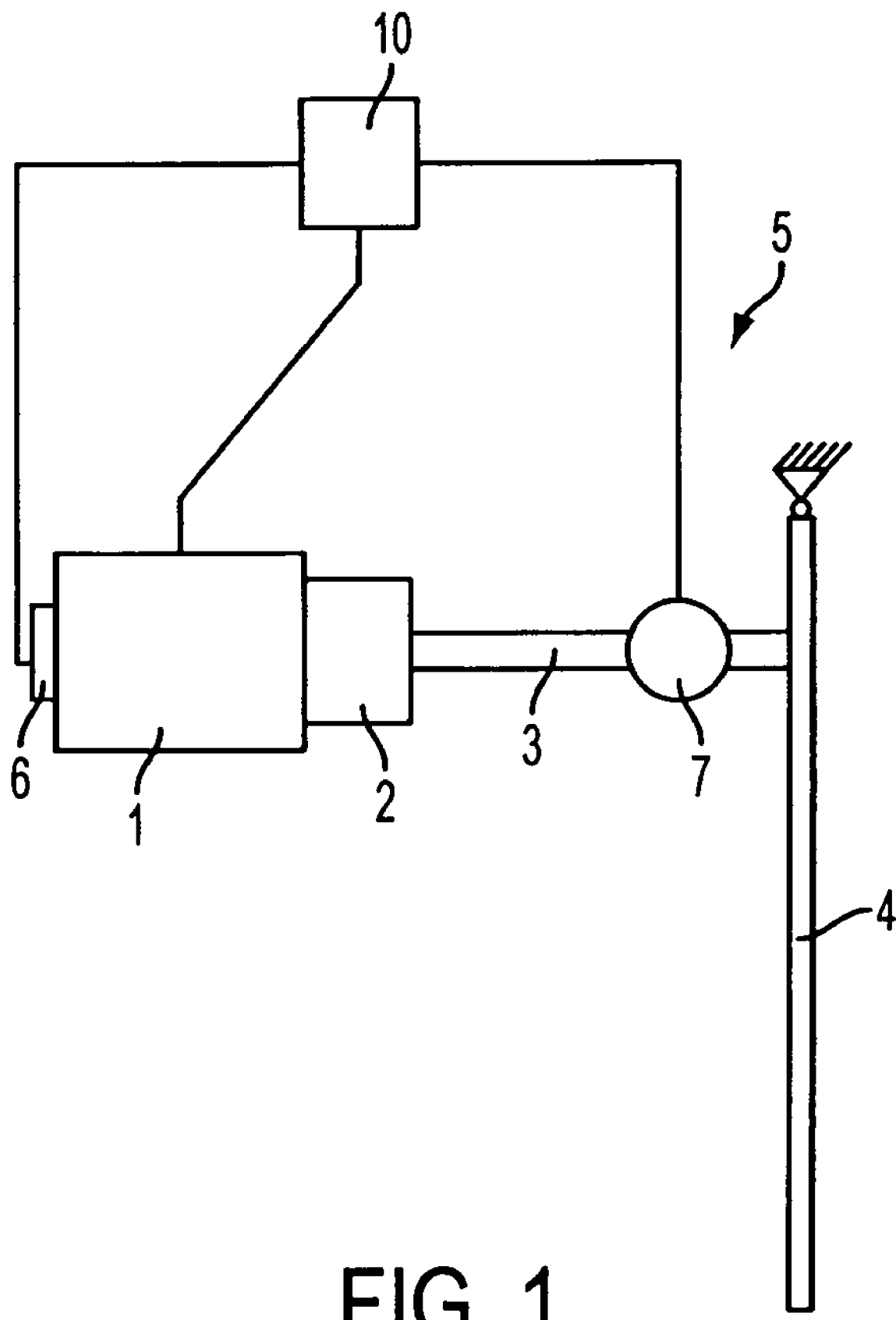
FIG. 1 is a schematic representation of a door drive coupled to a door and an apparatus for the control thereof in accordance with a preferred embodiment of the present disclosure.

The door drive 1 shown in FIG. 1 can be coupled in a manner known per se to a movable garage door, hall door or garden gate 4 via a reduction gear 2 and a drive train 3, with the garden gate, hall door or garage door 4 being able to be movable and made in various manners, e.g. as a swivel door, sliding door, sectional door and the like.

As FIG. 1 shows, the position of the door drive 1 and thus of the door 4 is sensed by a path-measuring device 5 which has, on the one hand, an incremental encoder 6 associated directly with the door drive 1 and a path-measuring sensor 7 connected in the drive train 3. The path-measuring sensor 7 emits, on the one hand, an absolute value signal which is unambiguously discrete over the whole path of the door 4 and, on the other hand, a plurality of reference points in signal form.

Using the signals of the incremental encoder 6 and of the path-measuring sensor 7, the control device 10 controls the door drive 1 to stop the door in the open and closed position and, optionally, in further intermediate positions, in the desired manner and to move it to and fro between these positions.

Figure 2:
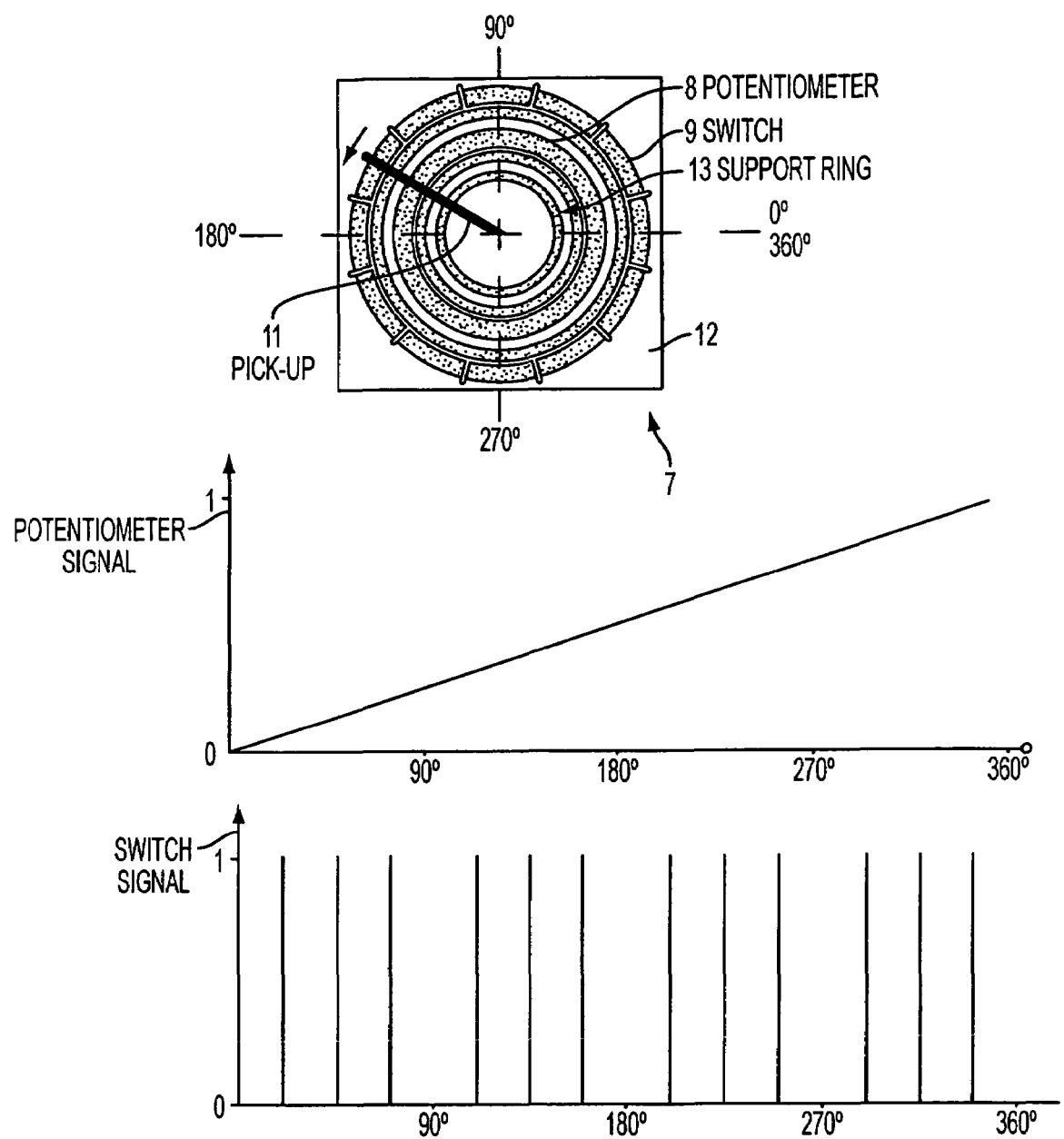
FIG. 2 is a schematic representation of a two-channel path-measuring sensor of the apparatus for the control of the door drive of FIG. 1, wherein the signals of the two channels of the path-measuring sensor are shown over the travel path in the two graphs below the representation of the path-measuring sensor.

The path-measuring sensor 7 is shown in more detail in FIG. 2. It is made with two channels, with the one channel being designed as an absolute value encoder 8, while the second channel works as a reference point encoder 9. A potentiometer which forms the absolute value encoder 8 and a voltage switch which forms the reference point encoder 9 are in particular integrated into the path-measuring sensor 7.

The absolute value encoder 8 and the reference point encoder 9 can be applied to a board material forming a carrier substrate 12 in the form of two respective rings or ring segments with different radii and a concentric arrangement, along with a support ring 13. The base material for the ring-shaped coating can be copper which is additionally provided with a conductive coating. The rings can in particular be provided with a low-ohmic layer of conductive paste for protection from corrosion and wear. The resistor ring of the potentiometer forming the absolute value encoder 8 can likewise be applied as a conductive paste, but preferably without a copper layer lying below it. The doping of the conductive paste can be linear with an increasing resistance value.

Two respective adjacent rings, which form the absolute value encoder 8, on the one hand, and the reference point encoder 9, on the other hand, are short-circuited with a pick-up made of metal, with the respectively inwardly disposed ring serving as a collector. The pick-ups can be applied to a common signal encoder element 11 which is rotatable relative to the ring arrangement, and indeed in accordance with the door movement, so that the actuation of the absolute value encoder 8 and of the reference point encoder 9 takes place synchronously with one another. The evaluation of the two signals in the control device 10 can accordingly also take place synchronously.

The signals generated by the potentiometer forming the absolute value encoder 8 and the switch forming the reference point encoder 9 are shown in the two graphs in FIG. 2. The potentiometer signal preferably increases linearly over the path of the door drive or of the door. The signals of the reference point encoder 9 are discrete digital reference point signals. The path-measuring sensor 7 shown in FIG. 2 is made and coupled to the door drive 1 or to the door 4 such that the signal encoder element 11 and the pick-ups fastened thereto rotate by somewhat less than 360° from the door open position to the door closed position, i.e. the total door drive path is formed in a rotation of less than 360°. The potentiometer signal of the path-measuring sensor 7 permits a rough determination of the door position with a corresponding wiring, with this information always being available directly after the switching on of the supply network and ensuring that no dangerous movements can take place by moving over the end positions. The fine resolution and thus path-determined information is gained by the switch signal of the path-measuring sensor 7 in combination with the rotational speed-dependent pulses of the incremental encoder 6 which is coupled to the door drive 1. The rotational speed pulses are counted starting from a specific reference point and the reaching of a desired door position, in particular the open and the closed end position, and optionally specific intermediate positions, is determined by a desired/actual comparison. The switch signal of the path-measuring sensor 7 serves as a calibration mark for the path-measuring device 5.

The system advantageously does not require any adjustment or setting of the path-measuring apparatus since any desired region of the potentiometer can be used. An overrun beyond the 0° or 360° position drawn in FIG. 2 is allowed. As long as the whole path is less than 360°, any desired start point and end point can be defined or used. Unlike the prior art, the potentiometer signal does not have to be constant, i.e. constantly increasing or constantly decreasing.

The invention claimed is:

1. An apparatus for controlling a door drive comprising: a path-measuring apparatus for the sensing of a door position and/or a door drive position and for the emission of a corresponding door position signal and a control device for the control of the door drive in dependence on an absolute value of the door position signal and at least one reference point, where the path-measuring apparatus is made with at least two channels and includes an absolute value encoder for the emitting of an absolute value signal on a first channel and a reference value encoder for the emitting of a plurality of reference point signals on a second channel; and where the control device distinguishes a respective reference point signal from other reference point signals using the associated absolute value signal and controls the door drive starting from a specific reference point.

2. The apparatus according to claim 1, wherein the path-measuring device is made with three channels and has an incremental encoder for the emitting of incremental path pulses on a third channel, and wherein the control device counts the path pulses of the incremental encoder starting from at least one specific reference point and controls the door drive in dependence on the number of path-measuring pulses counted.

3. The apparatus according to claim 1, wherein the path measuring device includes a two-channel path sensor element into which the absolute value encoder and the reference point encoder are integrated.

4. The apparatus according to claim 1, wherein the absolute value encoder comprises a potentiometer which emits an unambiguously discrete absolute value signal over the whole travel path of the door and/or of the door drive.

5. The apparatus according to claim 1, wherein the reference point encoder comprises a voltage switch.

6. The apparatus according to claim 3, wherein the path sensor element has a signal encoder element which is movable according to the door movement and/or door drive movement and by which both the absolute value encoder and the reference point encoder can be actuated.

7. The apparatus according to claim 6, wherein two pick-ups are provided at the signal encoder element, of which one actuates a potentiometer switch and the other actuates a circuit forming a voltage switch.

8. The apparatus according to claim 7, wherein the potentiometer circuit and the circuit forming the voltage switch are arranged on a substrate in the form of concentric circular rings or circular ring segments and the signal encoder element is rotatably supported relative to the substrate.

9. An apparatus for controlling a door drive comprising: a path-measuring apparatus configured to sense a door position and/or a door drive position and to emit a corresponding door position signal, the path-measuring apparatus having at least two channels and further including an absolute value encoder configured to emit an absolute value signal on a first channel and a reference value encoder configured to emit a plurality of reference point signals on a second channel; and a control device configured to control the door drive in dependence on the absolute value of the door position signal and at least one reference point, where the control device is further configured to distinguish a respective reference point signal from other reference point signals using the associated absolute value signal and to control the door drive starting from a specific reference point.

10. The apparatus according to claim 9 wherein said reference point signals provide a more accurate determination of door and/or door drive position than the absolute value signal.

11. The apparatus according to claim 10, wherein the path-measuring device further comprises three channels and has an incremental encoder configured to emit incremental path pulses on a third channel, and wherein the control device is further configured to count the path pulses of the incremental encoder starting from at least one specific reference point and to control the door drive in dependence on the number of path-measuring pulses counted.

12. The apparatus according to claim 11, wherein the path measuring device further comprises a two-channel path sensor element into which the absolute value encoder and the reference point encoder are integrated.

13. The apparatus according to claim 12, wherein the absolute value encoder further comprises a potentiometer which is configured to emit an unambiguously discrete absolute value signal over the whole travel path of the door and/or of the door drive.

14. The apparatus according to claim 13, wherein the reference point encoder comprises a voltage switch.

15. The apparatus according to claim 14, wherein the path sensor element has a signal encoder element which is movable according to the door movement and/or door drive movement and by which both the absolute value encoder and the reference point encoder can be actuated.

16. The apparatus according to claim 15, wherein two pick-ups are provided at the signal encoder element, of which one is configured to actuate a potentiometer switch and the other is configured to actuate a circuit forming a voltage switch.

17. The apparatus according to claim 16, wherein the potentiometer circuit and the circuit forming the voltage switch are arranged on a substrate in the form of concentric circular rings or circular ring segments and the signal encoder element is rotatably supported relative to the substrate.

* * * * *